(12) United States Patent
Konet

(10) Patent No.: US 8,057,288 B2
(45) Date of Patent: Nov. 15, 2011

(54) CONTACT-FREE VEHICLE AIR VENT

(75) Inventor: Heather Konet, Canton, MI (US)

(73) Assignee: Nissan North America, Inc., Franklin, TN (US)

( * ) Notice: Subject to any disclaimer, the term of this patent is extended or adjusted under 35 U.S.C. 154(b) by 533 days.

(21) Appl. No.: 12/143,578

(22) Filed: Jun. 20, 2008

(65) Prior Publication Data

US 2009/0318069 A1 Dec. 24, 2009

(51) Int. Cl.
*B60H 1/34* (2006.01)
(52) U.S. Cl. ........................................ 454/155; 454/152
(58) Field of Classification Search .................. 454/155
See application file for complete search history.

(56) References Cited

U.S. PATENT DOCUMENTS

| | | | |
|---|---|---|---|
| 5,844,415 A | 12/1998 | Gershenfeld et al. | |
| 5,914,610 A | 6/1999 | Gershenfeld et al. | |
| 5,936,412 A | 8/1999 | Gershenfeld et al. | |
| 6,025,726 A | 2/2000 | Gershenfeld et al. | |
| 6,550,686 B2 * | 4/2003 | Kawai et al. | 236/49.3 |
| 6,837,786 B2 | 1/2005 | Linde et al. | |
| 7,109,726 B2 | 9/2006 | Van Berkel | |
| 7,115,856 B2 | 10/2006 | Peng et al. | |
| 2005/0088409 A1 | 4/2005 | Van Berkel | |
| 2005/0239389 A1 * | 10/2005 | Jahn et al. | 454/127 |
| 2007/0052428 A1 | 3/2007 | Van Berkel | |
| 2007/0139049 A1 | 6/2007 | Van Berkel | |
| 2007/0243810 A1 * | 10/2007 | Browne et al. | 454/152 |
| 2007/0294639 A1 | 12/2007 | Van Berkel et al. | |
| 2008/0004769 A1 * | 1/2008 | Lenneman et al. | 701/36 |
| 2009/0072883 A1 * | 3/2009 | Ehrlich et al. | 327/517 |

FOREIGN PATENT DOCUMENTS

WO WO-2007/013011 A1 2/2007

* cited by examiner

*Primary Examiner* — Steven B McAllister
*Assistant Examiner* — Samantha Miller
(74) *Attorney, Agent, or Firm* — Global IP Counselors, LLP

(57) ABSTRACT

A contact-free air vent flow direction control device includes an air vent, a positioning mechanism, a touch-less motion sensor and a control unit. The air vent has at least one flow control blade configured to move between a plurality of predetermined orientations each corresponding to a direction of air flow from the air vent. The positioning mechanism is operably coupled to the flow control blade. The touch-less motion sensor is configured to detect relative movement of objects proximate the touch-less motion sensor. The control unit is operably connected to the touch-less motion sensor and the positioning mechanism to control operation of the positioning mechanism in order to position the flow control blade in a selected one of the predetermined orientations in response to a corresponding one of a plurality of predetermined movements detected by the touch-less motion sensor.

13 Claims, 9 Drawing Sheets

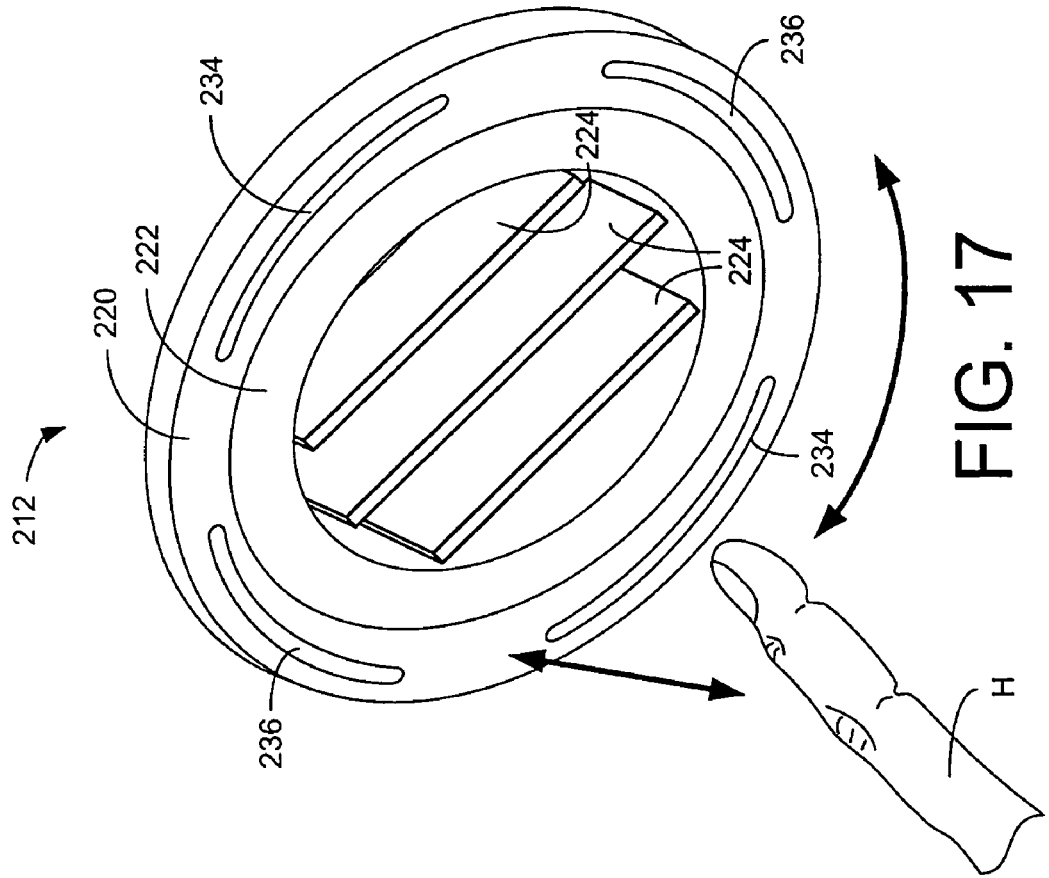
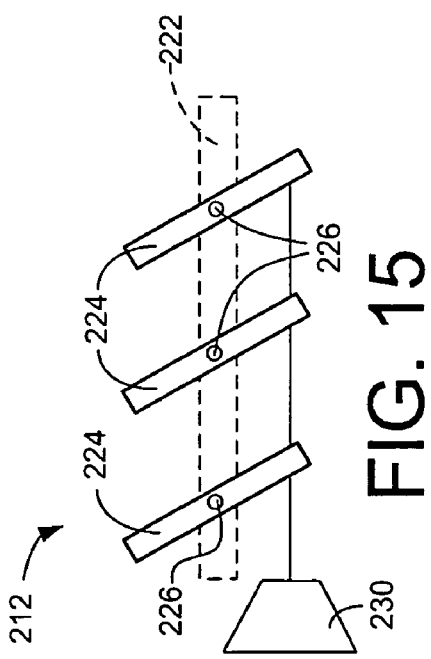
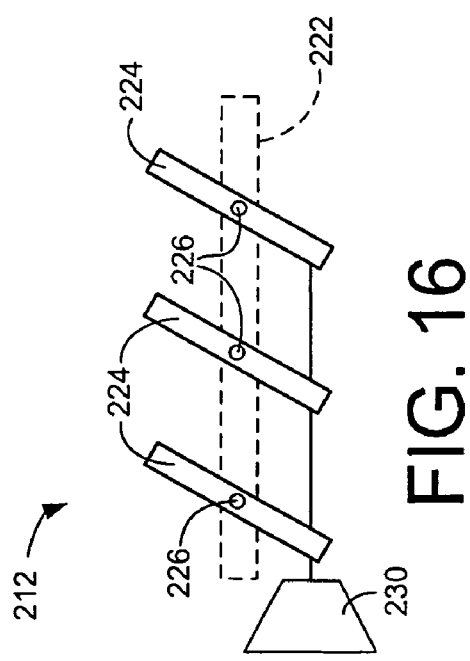

CONTACT-FREE VEHICLE AIR VENT

BACKGROUND OF THE INVENTION

1. Field of the Invention

The present invention relates to a vehicle contact-free air vent. More specifically, the present invention relates to vehicle air vent configured such that adjustments of direction of air flow are made without contact by the vehicle driver or passenger.

2. Background Information

Safety concerns are of paramount importance in the design of new features for automotive vehicles. One area of concern relates to the various features of a vehicle that must be touched and manipulated by a vehicle driver, such as a vehicle's air conditioning system controls. In order for a driver to change the speed of the blower motor fan or the direction of air flowing out of an air vent, the driver must briefly focus his or her attention on the blower motor fan control and/or the blades of the air vent. Even a momentary re-focusing of the driver's attention away from the road can be dangerous.

In view of the above, it will be apparent to those skilled in the art from this disclosure that there exists a need for an improved air vent and blower motor control configuration that allows the driver to adjust air flow from an air vent with less distraction that might divert the driver's attention away from driving. This invention addresses this need in the art as well as other needs, which will become apparent to those skilled in the art from this disclosure.

SUMMARY OF THE INVENTION

One object of the present invention is to allow a driver to change air flow direction from a vehicle air vent without having to touch or make contact with either a switch or the air vent.

Another object of the present invention is to allow a driver to change air flow speed from a vehicle air vent without having to touch or make contact with either a switch or the air vent.

In accordance with one aspect of the present invention, a contact-free air vent flow direction control device includes an air vent, a positioning mechanism, a contact-free or touch-less motion sensor and a control unit. The air vent has at least one flow control blade configured to move between a plurality of predetermined orientations each corresponding to a direction of air flow from the air vent. The positioning mechanism is operably coupled to the flow control blade. The touch-less motion sensor is configured to detect relative movement of objects proximate the touch-less motion sensor. The control unit is operably connected to the touch-less motion sensor and the positioning mechanism to control operation of the positioning mechanism in order to position the flow control blade in a selected one of the predetermined orientations in response to a corresponding one of a plurality of predetermined movements detected by the touch-less motion sensor.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 15 is a sectional view of a portion of the contact-free air vent taken along the line 15-15 in FIG. 13, showing the air blades pivoted to a first position in accordance with the third embodiment of the present invention;

FIG. 16 is another sectional view of a portion of the contact-free air vent similar to FIG. 15 showing the air blades pivoted to a second position in accordance with the third embodiment of the present invention; and FIG. 17 is a perspective view of the contact-free air vent showing a human hand moving in close proximity to the contact-free air vent in order to adjust the direction of air flow from the contact-free air vent in accordance with the third embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention are provided for illustration only and not for the purpose of limiting the invention as defined by the appended claims and their equivalents.

Figure 1:
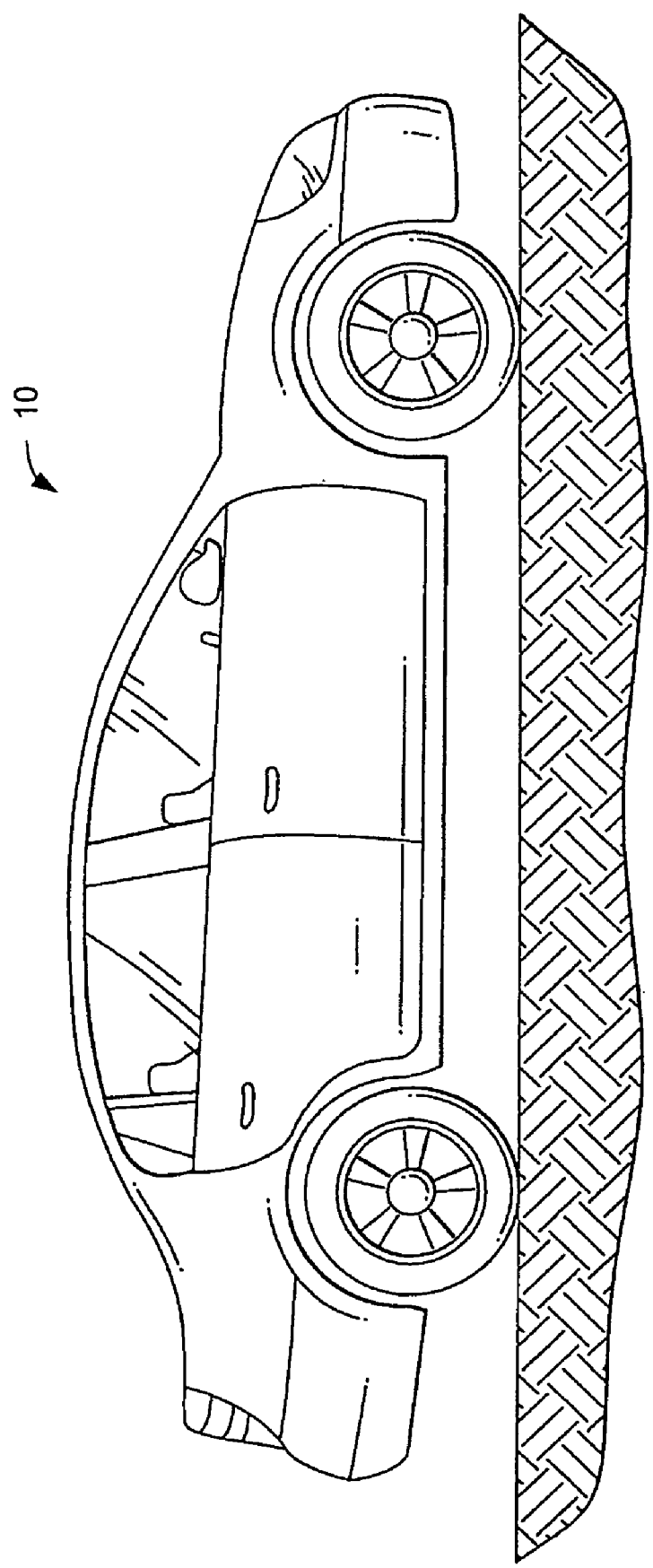
FIG. 1 is a side elevation of a vehicle in accordance with the present invention.
Figure 2:
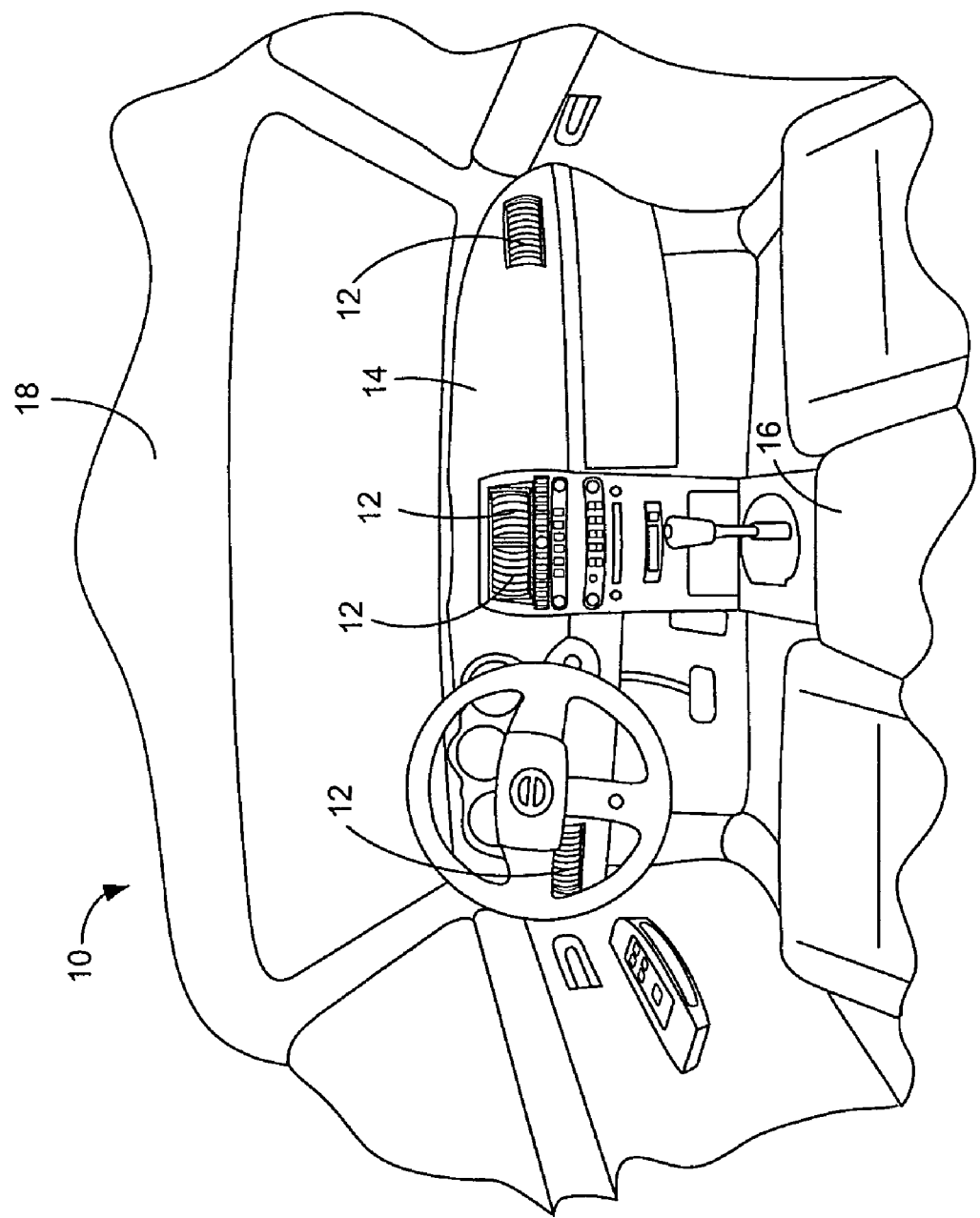
FIG. 2 is an interior view of the vehicle showing a dashboard with a plurality of contact-free air vents in accordance with a first embodiment of the present invention.

Referring initially to FIG. 1, a vehicle 10 is illustrated in accordance with a first embodiment of the present invention. As shown in FIG. 2, an interior portion of the vehicle 10 includes a plurality of contact-free air vents 12 installed to, for example, the dashboard 14 of the vehicle 10. It should be understood from the drawings and the description herein that the contact-free air vents 12 can be installed in any of a variety of locations not limited solely to the dashboard 14. For example, the contact-free air vent 12 can be installed to portions of the center console 16, the headliner 18, or other advantageous or desirable locations within the vehicle 10.

Each of the contact-free air vents 12 operates in the same manner. Therefore, for the sake of brevity, only one contact-free air vent 12 is described hereinbelow. The contact-free air vent 12 is a touch-less air vent that detects a plurality of differing hand movements when a hand is positioned adjacent to the contact-free air vent 12. Once the hand movement is identified, the contact-free air vent 12 automatically adjusts the direction(s) of flow of air from the contact-free air vent 12 accordingly without the need for contacting or touching the contact-free air vent 12, as described in greater detail below.

Figure 3:
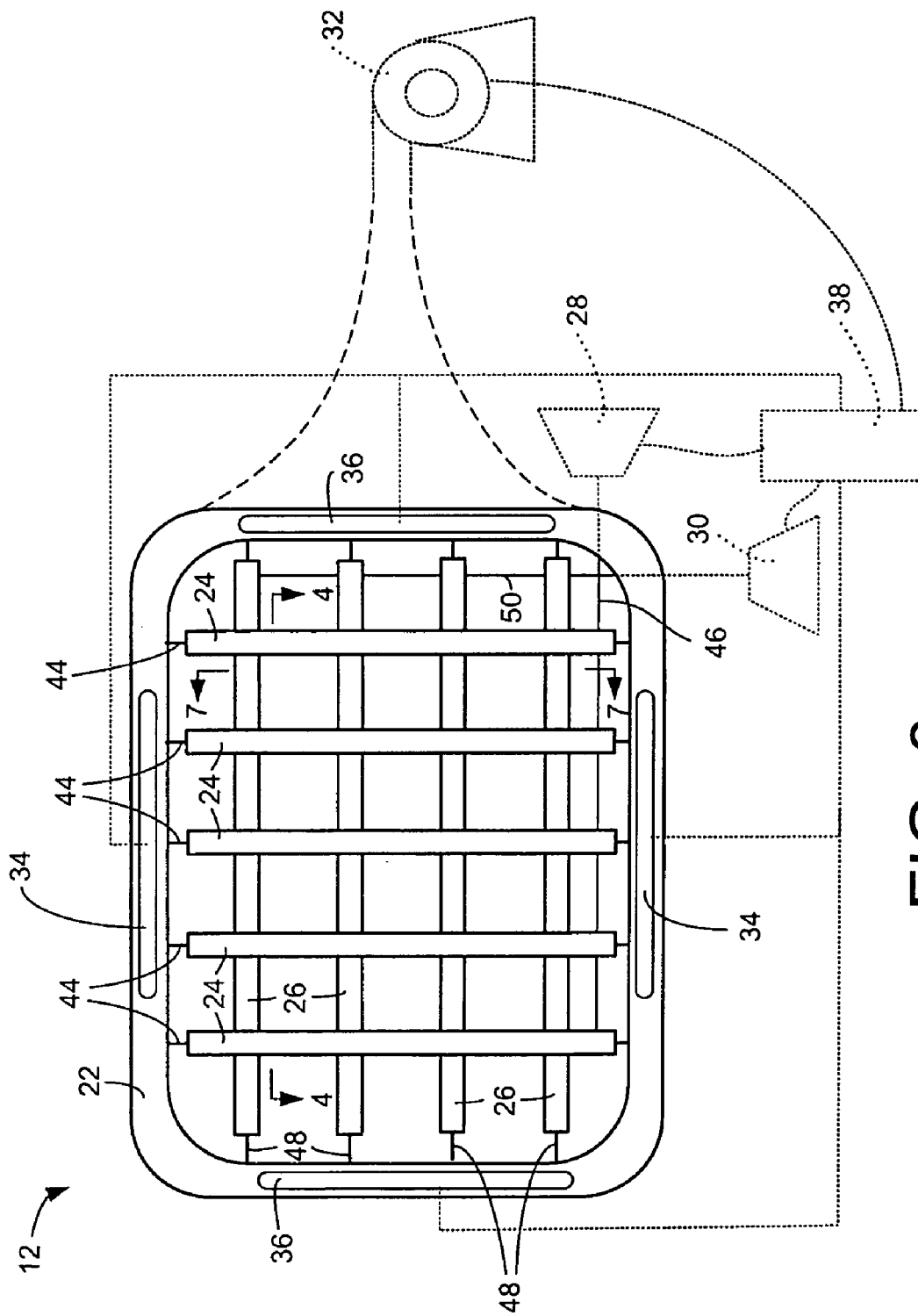
FIG. 3 is a schematic elevational view of one of the contact-free air vents showing vertically oriented air blades and horizontally oriented air blades positioned to allow air to flow straight out of the contact-free air vent in accordance with the first embodiment of the present invention.

A detailed description of the contact-free air vent 12 in accordance with a first embodiment is provided now with specific reference to FIGS. 3-10. As best shown in FIG. 3, the contact-free air vent 12 basically includes an outer housing 22, a plurality of vertically oriented air blades 24 (a first set of flow control blades), a plurality of horizontally oriented air blades 26 (a second set of flow control blades), a first servo device 28, a second servo device 30, a blower motor 32, a first pair of sensors 34, a second pair of sensors 36 and a controller 38.

Figure 9:
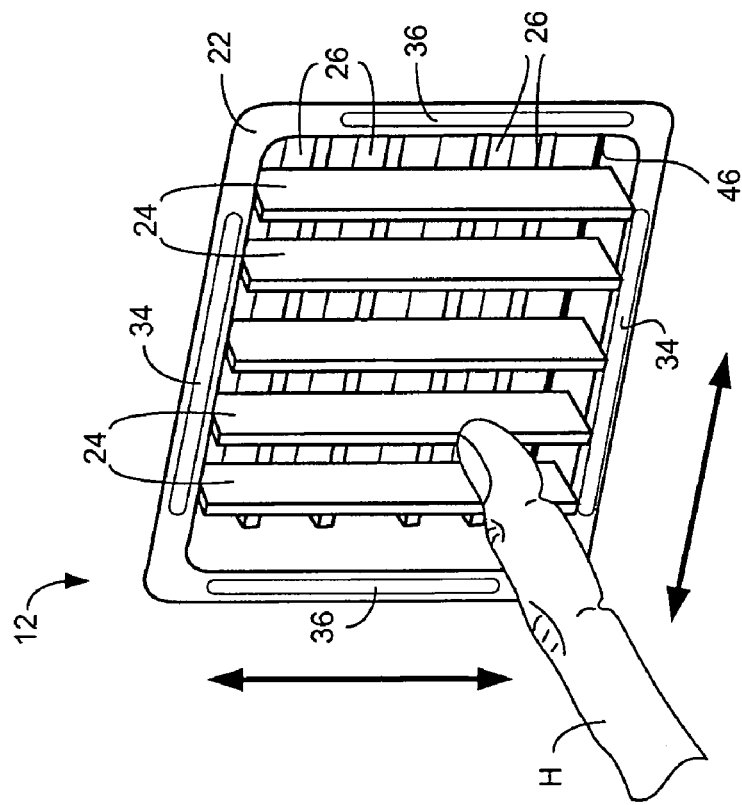
FIG. 9 is a perspective view of the contact-free air vent showing a human hand moving in close proximity to the contact-free air vent in order to adjust the direction of air flow from the contact-free air vent in accordance with the first embodiment of the present invention.

The outer housing 22 is configured to mount or attach the contact-free air vent 12 to the dashboard 14 in a conventional manner. For instance, the outer housing 22 can be provided with fasteners (not shown) or a snap-fit series of flexible projections (not shown) that engage the surface of an aperture in the dashboard 14. Such conventional attaching configurations are well known and therefore description is omitted for the sake of brevity. The outer housing 22 includes a pair of spaced apart vertical blade supports 40 (only one is shown in FIGS. 4, 5 and 6) and a pair of spaced apart horizontal blade holders 42 (only one is shown in FIGS. 7 and 9) that are concealed within the outer housing 22 and are therefore not readily visible in FIG. 3.

Figure 4:
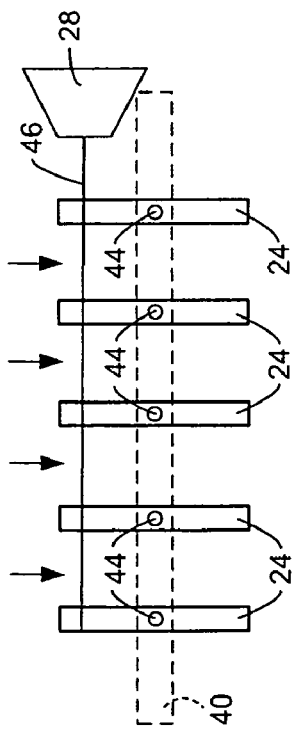
FIG. 4 is a top schematic view of a portion of the contact-free air vent taken schematically along the line 4-4 in FIG. 3 showing the vertically oriented air blades positioned to allow air to flow straight out from the contact-free air vent in accordance with the first embodiment of the present invention.
Figure 5:
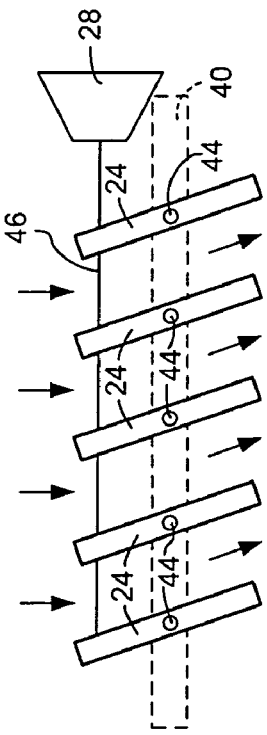
FIG. 5 is another top schematic view of the portion of the contact-free air vent similar to FIG. 4 showing the vertically oriented air blades positioned to allow air to flow in a rightward side direction from the contact-free air vent in accordance with the first embodiment of the present invention.
Figure 6:
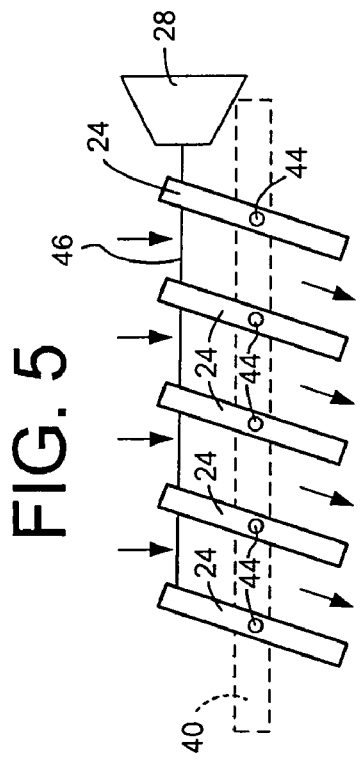
FIG. 6 is another top schematic view of the portion of the contact-free air vent similar to FIGS. 4 and 5 showing the vertically oriented air blades positioned to allow air to flow in a leftward side direction from the contact-free air vent in accordance with the first embodiment of the present invention.

The plurality of vertically oriented air blades 24 (a set of first flow control blades) are configured to move in unison between a plurality of predetermined orientations to direct flow of air from the air vent relative a first air vent direction, as indicated in FIGS. 3-6 and described below. The plurality of vertically oriented air blades 24 are pivotally supported between the pair of spaced apart vertical blade supports 40. The plurality of vertically oriented air blades 24 each pivot about parallel pivot rods 44 such that they are configured to move between the plurality of predetermined orientations corresponding to differing directions of air flow from the contact-free air vent 12. For example, FIGS. 3, 4, 5 and 6 show three differing orientations corresponding to directions of air flow from the contact-free air vent 12. Specifically, FIGS. 3 and 4 show an orientation where the air can flow straight out of the contact-free air vent 12; FIG. 5 shows an orientation where the air can flow rightward from the contact-free air vent 12; and FIG. 6 shows an orientation where the air can flow leftward from the contact-free air vent 12.

The plurality of vertically oriented air blades 24 are further coupled to one another by a connecting member 46 such that the plurality of vertically oriented air blades 24 pivot about the parallel pivot rods 44 in unison. In other words, if one of the plurality of vertically oriented air blades 24 pivots, all of the plurality of vertically oriented air blades 24 pivot. The connecting member 46 is further connected to the first servo device 28.

Figure 8:
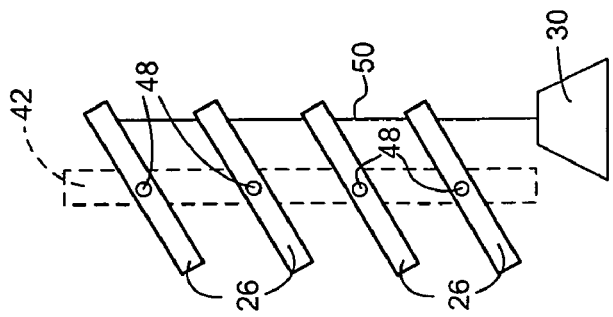
FIG. 8 is a side schematic view of the other portion of the contact-free air vent similar to FIG. 8 showing the horizontally oriented air blades positioned to allow air to flow in a downward direction from the contact-free air vent in accordance with the first embodiment of the present invention.
Figure 7:
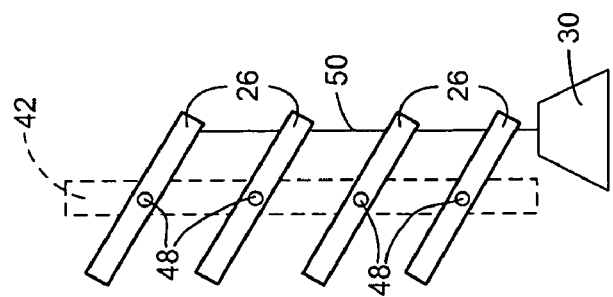
FIG. 7 is a side schematic view of another portion of the contact-free air vent taken schematically along the line 7-7 in FIG. 3 showing the horizontally oriented air blades positioned to allow air to flow in an upward direction from the contact-free air vent in accordance with the first embodiment of the present invention.

The plurality of horizontally oriented air blades 26 (a set of second flow control blades) are configured to move in unison between a variety of the predetermined orientations to direct flow of air from the air vent relative to a second air vent direction angularly offset from the first air vent direction, as indicated in FIGS. 3, 7 and 8. Specifically, the plurality of vertically oriented air blades 24 control air flow rightward and leftward from the contact-free air vent 12 and the plurality of horizontally oriented air blades 26 control air flow upward and downward from the contact-free air vent 12.

The plurality of horizontally oriented air blades 26 are pivotally supported between the pair of spaced apart horizontal blade holders 42. The plurality of horizontally oriented air blades 26 each pivot about parallel pivot rods 48 such that they are configured to move between a plurality of predetermined orientations corresponding to directions of air flow from the contact-free air vent 12. For example, FIGS. 3, 7 and 8 show three differing orientations corresponding to a direction of flow from the contact-free air vent 12. Specifically, FIG. 3 shows an orientation where the air can flow straight out of the contact-free air vent 12; FIG. 7 shows an orientation where the air can flow upward from the contact-free air vent 12; and FIG. 8 shows an orientation where the air can flow downward from the contact-free air vent 12.

The plurality of horizontally oriented air blades 26 are further coupled to one another by a connecting member 50 such that the plurality of horizontally oriented air blades 26 pivot about the parallel pivot rods 48 in unison. In other words, if one of the plurality of vertically oriented air blades 24 pivots, all of the plurality of vertically oriented air blades 24 pivot. The connecting member 50 is further connected to the second servo device 30.

The first servo device 28 and the second servo device 30 serve as positioning mechanisms that are operably coupled to the vertically oriented air blades 24 and the horizontally oriented air blades 26 in order to position them to direct air flow in a desired direction, as described below. The first servo device 28 and the second servo device 30 are preferably stepper motors, but can alternatively be any of a variety of electronic devices such as electric motors or solenoids, pneumatic devices or other similar devices that provide positioning control. The first servo device 28 is connected to the connecting member 46, which is further connected to each of the plurality of vertically oriented air blades 24. The first servo device 28 is configured and dimensioned to move and position the plurality of vertically oriented air blades 24 in response to electronic control signals from the controller 38, as described in greater detail below. Similarly, the second servo device 30 is connected to the connecting member 50, which is further connected to each of the plurality of horizontally oriented air blades 26. The second servo device 30 is configured and dimensioned to move and position the plurality of horizontally oriented air blades 26 in response to electronic control signals from the controller 38, as described in greater detail below.

It should be understood from the drawings and the description herein that the first and second servo devices 28 and 30 can optionally include indexing circuitry such that position feedback signals can be provided to the controller 38 such that the controller 38 can process such position feedback signals in order to calibrate and correlate position changing signals with the position feedback signals.

The blower motor 32 is a conventional vehicle component that is configured to operate at a prescribed number of blowing speeds. The blower motor 32 is operably connected to the controller 38 such that the controller 38 can change the blowing speed of the blower motor 32 in response to a determination that change in the blowing speed is required, as described in greater detail below.

The first pair of sensors 34 and the second pair of sensors 36 are each touch-less motion sensors configured to detect relative movement of objects proximate one or both of the first pair of sensors 34 and the second pair of sensors 36. The first pair of sensors 34 is preferably provided on opposing upper and lower portions of the outer housing 22, as shown in FIG. 3. Alternatively, they can be installed at and along the four corners of the outer housing 22. The second pair of sensors 36 is disposed on opposite lateral sides of the outer housing 22, as is also shown in FIG. 3. The first and second pair of sensors 34 and 36 can be any of a variety of conventional object and position detecting sensors, such as, for example, those disclosed in the following patent documents: U.S. Pat. Nos. 6,050981, 6,025,726, 5,844,415, 5,936,412 and 5,914,610, all to Gershenfeld et al.; U.S. Pat. No. 7,109,726 to Van Berkel; U.S. Patent Application Publication Nos. 2005/0088409 and 2007/0139049, both to Van Berkel; U.S. Patent Application Publication No. 2007/0294639 and 2007/0052428, both to Van Berkel et al.; and WO 2007/013011 to Van Berkel.

Figure 10:
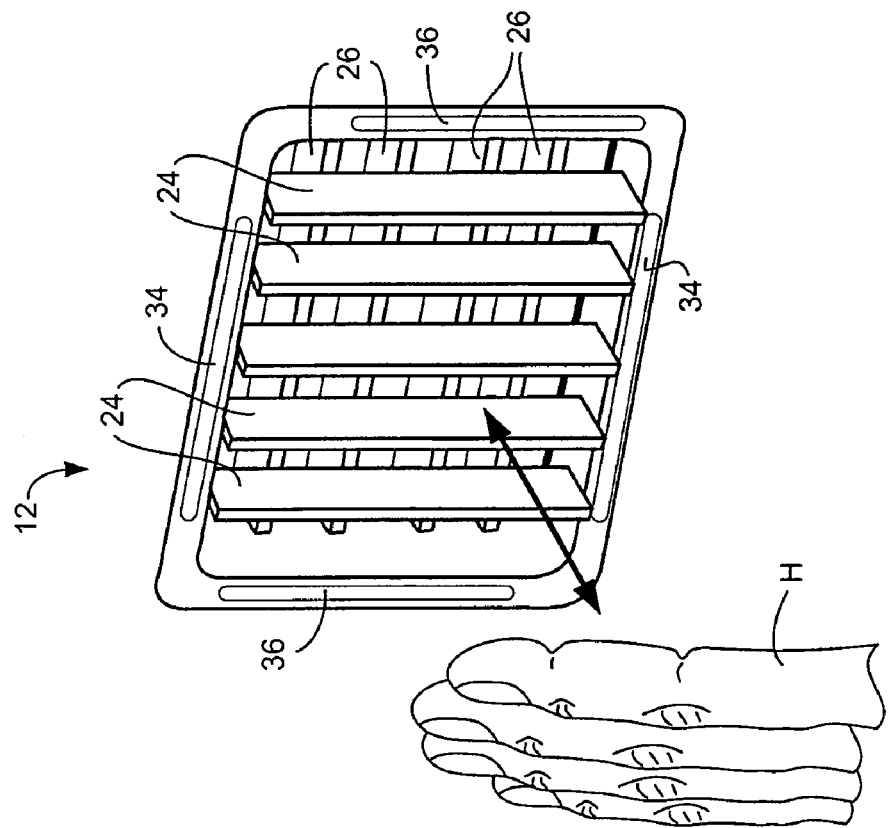
FIG. 10 is a perspective view of the contact-free air vent showing a human hand moving toward or away from the contact-free air vent in order to adjust the speed of a blower motor providing air flowing out of the contact-free air vent in accordance with the first embodiment of the present invention.

Since the basic operation of the first pair of sensors 34 and the second pair of sensors 36 is conventional, description thereof is limited for the sake of brevity. Specifically, the first pair of sensors 34 is preferably electro static field sensing electrodes or cross-capacitance current measuring sensors that operate independently from the second pair of sensors 36. The second pair of sensors 36 is also preferably electro static field sensing electrodes or cross-capacitance current measuring sensors that operate independently from the first pair of sensors 34. The first pair of sensors 34 and the second pair of sensors 36 detect disturbances in electronic fields emanating therefrom when an object, such as a human hand H is positioned near the contact-free air vent 12, as indicated in FIGS. 9 and 10 and described further below. The first and second pair of sensors 34 and 36 provide a means for determining position and relative movement of objects adjacent to the contact-free air vent 12.

The controller 38 (a control unit) is operably or electrically connected to the first servo device 28, the second servo device 30 (the positioning mechanisms), the blower motor 32, the first pair of sensors 34 and the second pair of sensors 36 (the touch-less sensors). The controller 38 includes, for example, a central processing unit (CPU), memory (RAM and/or ROM) and associated circuitry. The controller 38 is configured and/or programmed to send positioning signals to the first servo device 28 and the second servo device 30 and also optionally configured to receive positioning signals from the first servo device 28 and the second servo device 30 corresponding to the angular orientation of the plurality of vertically oriented air blades 24 and the plurality of horizontally oriented air blades 26, respectively. The controller 38 is also configured to change the blowing speed of the blower motor 32.

The controller 38 is further configured to evaluate movements of the human hand H as detected by one or both of the first pair of sensors 34 and the second pair of sensors 36. The controller 38 is further configured to distinguish between a plurality of predetermined movements of the human hand H as detected by the first pair of sensors 34 and the second pair of sensors 36, as described in greater detail below. Each one of the plurality of predetermined movements of the human hand H corresponds to a specific action to be effected by the controller 38, as described below.

Specifically, the controller 38 (the control unit) is configured to position the vertically oriented air blades 24 and the horizontally oriented air blades 26 in order to position them in a selected one of the predetermined orientations in response to a corresponding one of a plurality of predetermined movements detected by the first and second pair of sensors 34 and 46 (the touch-less motion sensors). The controller 38 is further configured to determine the presence of a driver's hand or finger in response to the driver's hand or finger being positioned within a predetermined distance from one or both of the first and second pair of sensors 34 and 46 (the touch-less motion sensors) for a predetermined time period, and ignore the presence of the driver's hand or finger in response to the driver's hand or finger being positioned within the predetermined distance from the first and/or second pair of sensors 34 and 36 for less than the predetermined time period. The controller 38 is also configured to change position of the vertically and horizontally oriented air blades 24 and 26 in response to determining the presence of the driver's hand or finger and then determining that the driver's hand or finger has moved in a predetermined direction relative to the first and/or second pair of sensors 34 and 36.

Specifically, when the controller 38 receives signals from the first and/or second pair of sensors 34 and 36 indicating that the human hand H is positioned adjacent to the contact-free air vent 12, the controller 38 monitors the time the human hand H is located adjacent to the contact-free air vent 12. For instance, if the human hand H quickly passes by the contact-free air vent 12, no action is taken. The driver of the vehicle 10 may have moved his hand quickly to take other actions within the vehicle 10, such as turning off or on lights, a turn signal or other similar action. However, if the human hand H is positioned adjacent to the contact-free air vent 12 for a predetermined period of time, for example, more than one second or two seconds, then the controller 38 continues to monitor signals from the first and second pair of sensors 34 and 36. More specifically, the controller 38 monitors for signals corresponding to a plurality of predetermined movements of the human hand H.

For example, one of the plurality of predetermined movements includes rightward movement of the human hand H, as indicated by the arrows in FIG. 9. Once the controller 38 determines that the human hand H has moved rightward, the controller 38 transmits a corresponding signal to the first servo device 28 causing first servo device 28 to re-position the plurality of vertically oriented air blades 24 to angle rightward, as indicated in FIG. 5, such that air flow from the contact-free air vent 12 exhausts in a more rightward direction.

Another one of the plurality of predetermined movements includes leftward movement of the human hand H, as indicated by the arrows in FIG. 9. Once the controller 38 determines that the human hand H has moved leftward, the controller 38 transmits a corresponding signal to the first servo device 28 causing first servo device 28 to re-position the plurality of vertically oriented air blades 24 to angle leftward, as indicated in FIG. 6, such that air flow from the contact-free air vent 12 exhausts in a more leftward direction.

Another of the plurality of predetermined movements includes upward movement of the human hand H, as indicated by the arrows in FIG. 9. Once the controller 38 determines that the human hand H has moved upward, the controller 38 transmits a corresponding signal to the second servo device 30 causing second servo device 30 to re-position the plurality of horizontally oriented air blades 26 to angle upward, as indicated in FIG. 7, such that air flow from the contact-free air vent 12 exhausts in a more upward direction.

Another of the plurality of predetermined movements includes downward movement of the human hand H, as indicated by the arrows in FIG. 9. Once the controller 38 determines that the human hand H has moved downward, the controller 38 transmits a corresponding signal to the second servo device 30 causing second servo device 30 to re-position the plurality of horizontally oriented air blades 26 to angle downward, as indicated in FIG. 8, such that air flow from the contact-free air vent 12 exhausts in a more downward direction.

Thus, the controller 38 is configured to re-position the orientation of the plurality of vertically oriented air blades 24 in response to detected horizontal movements and configured to re-position the orientation of the plurality of plurality of horizontally oriented air blades 26 in response to detected vertical movements.

The controller 38 can also be configured to control the power level of the blower motor 32. Specifically, another of the predetermined movements includes outward movement of the human hand H away from the contact-free air vent 12, as indicated by the arrows in FIG. 10. Once the controller 38 determines that the human hand H has moved outward away from the contact-free air vent 12, the controller 38 transmits a corresponding signal to the blower motor 32 causing blower motor 32 to increase blowing speed. Similarly, another of the predetermined movements includes inward movement of the human hand H toward the contact-free air vent 12, as indicated by the arrows in FIG. 10. Once the controller 38 determines that the human hand H has moved toward the contact-free air vent 12, the controller 38 transmits a corresponding signal to the blower motor 32 causing blower motor 32 to decrease blowing speed.

Thus, the controller 38 is configured to increase the output of the blower motor 32 in response to detected movement away from the contact-free air vent 12 and configured to decrease the output of the blower motor 32 in response to detected movement toward the contact-free air vent 12.

Figure 11:
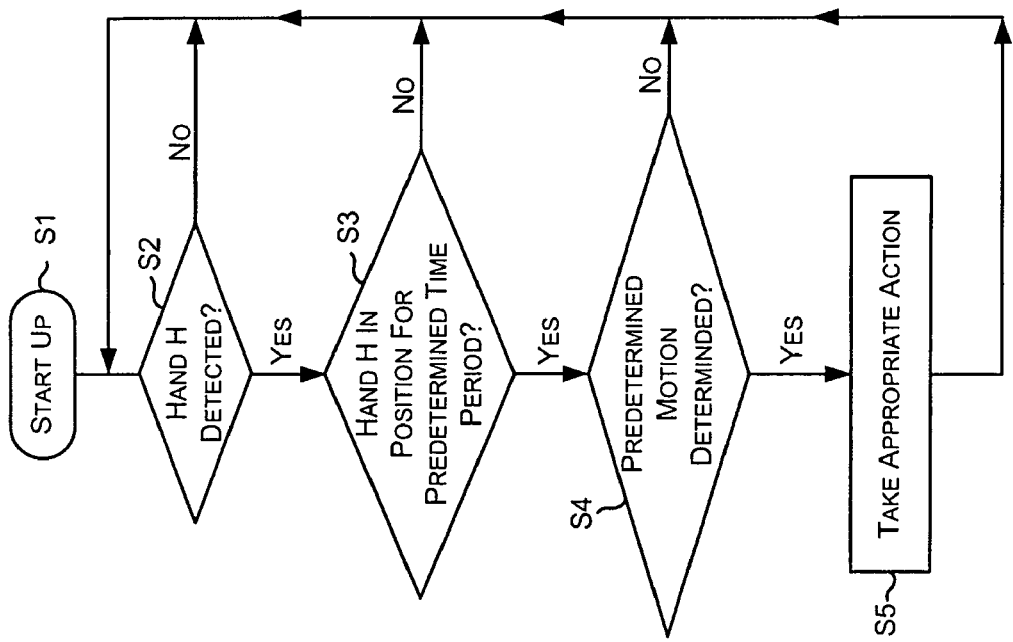
FIG. 11 is a flowchart showing various steps of operation of a controller of the contact-free air vent in accordance with the present invention.

Function and operation of the controller 38 are best shown in the flowchart depicted in FIG. 11. In step S1 the controller 38 starts up, for example when the vehicle 10 is started and/or when the air conditioning system within the vehicle 10 powers on.

At step S2, the controller 38 continuously monitors the output from the first and second pair of sensors 34 and 36. If the proximity of the human hand H to the contact-free air vent 12 is determined, then the controller 38 proceeds to step S3, otherwise, the controller 38 continues to monitor output from the first and second pair of sensors 34 and 36 in step S2.

It should be understood from the drawings and the description herein that the first and second pair of sensors 34 and 36 can be adjusted to detect the presence of the human hand H only when the human hand is within a predetermined distance range from the contact-free air vent 12. For example, the predetermined distance range can be as small as one centimeter or can be several inches from the contact-free air vent 12, depending upon the vehicle 10 and the location of the contact-free air vent 12 within the vehicle. Specifically, if the contact-free air vent 12 is located between the steering column and the driver's side door, then the predetermined distance range can be made small because the driver is close to the contact-free air vent 12. For instance, the predetermined distance range can be as small as one half inch to two inches away from the contact-free air vent 12. However, if the contact-free air vent 12 is located in the center of the dashboard 14, the predetermined distance range can be made larger, for instance between one inch and 6 inches from the contact-free air vent 12. It should be understood from the drawings and the description herein that the predetermined distance range is a variable quantity that will be different from vehicle to vehicle and location to location within the vehicle.

In step S3, the controller 38 determines whether or not the human hand is within the predetermined distance range from the contact-free air vent 12 for a predetermined amount of time. The predetermined amount of time is variable, but is preferably at least one second but can be five seconds or longer. Once the controller 38 determines that the human hand has been within the predetermined distance range from the contact-free air vent 12 for at least the predetermined amount of time, the controller 38 moves to step S4. Otherwise, operation of the controller 38 returns to step S1, as indicated in FIG. 11.

In step S4, the controller 38 monitors the outputs from the first and second pair of sensors 34 and 36 and evaluates movements of the human hand H. Specifically, the controller 38 processes the outputs from the first and second pair of sensors 34 and 36 to determine whether or not the human hand H is exhibiting one of the plurality of predetermined movements described above. If the controller 38 determines that the human hand H has moved in accordance with one of the plurality of predetermined movements then the controller 38 takes appropriate action at step S5. Otherwise, operation returns to step S1.

In step S5, the controller 38 takes appropriate actions. For instance, if the controller 38 determines that the human hand H has moved rightward in step S4, then the controller 38 transmits a corresponding signal to the first servo device 28 causing first servo device 28 to re-position the plurality of vertically oriented air blades 24 to angle rightward, as indicated in FIG. 5, such that air flow from the contact-free air vent 12 exhausts in a more rightward direction.

In step S5, if the controller 38 determines that the human hand H has moved leftward, the controller 38 transmits a corresponding signal to the first servo device 28 causing first servo device 28 to re-position the plurality of vertically oriented air blades 24 to angle leftward, as indicated in FIG. 6, such that air flow from the contact-free air vent 12 exhausts in a more leftward direction.

In step S5, if the controller 38 determines that the human hand H has moved upward, the controller 38 transmits a corresponding signal to the second servo device 30 causing second servo device 30 to re-position the plurality of horizontally oriented air blades 26 to angle upward, as indicated in FIG. 7, such that air flow from the contact-free air vent 12 exhausts in a more upward direction.

In step S5, if the controller 38 determines that the human hand H has moved downward, the controller 38 transmits a corresponding signal to the second servo device 30 causing second servo device 30 to re-position the plurality of horizontally oriented air blades 26 to angle downward, as indicated in FIG. 8, such that air flow from the contact-free air vent 12 exhausts in a more downward direction.

In step S5, if the controller 38 determines that the human hand H has moved outward away from the contact-free air vent 12, the controller 38 transmits a corresponding signal to the blower motor 32 causing blower motor 32 to increase blowing speed.

In step S5, if the controller 38 determines that the human hand H has moved toward the contact-free air vent 12, the controller 38 transmits a corresponding signal to the blower motor 32 causing blower motor 32 to decrease blowing speed.

Once the controller 38 has taken appropriate action, operation returns to step S1.

Thus, the driver of the vehicle 10 can change the speed of the blower motor 32 and the direction of air flow from the contact-free air vent 12 by positioning the human hand H or a finger in front of the contact-free air vent 12 for a predetermined time period (a second or two), then make a simple motion that is detected by the first and second pair of sensors 34 and 36. The simple motion is determined by the controller 38, which then effects an appropriate action by either changing the speed of the blower motor 32 and/or changing the position of one or both of the plurality of vertically oriented air blades 24 and/or the plurality of horizontally oriented air blades 26.

It should be understood from the drawings and the description herein, that the above described embodiment is only one example of the present invention. The various embodiments described below are further examples, but not the only examples of the present invention.

Second Embodiment

Figure 12:
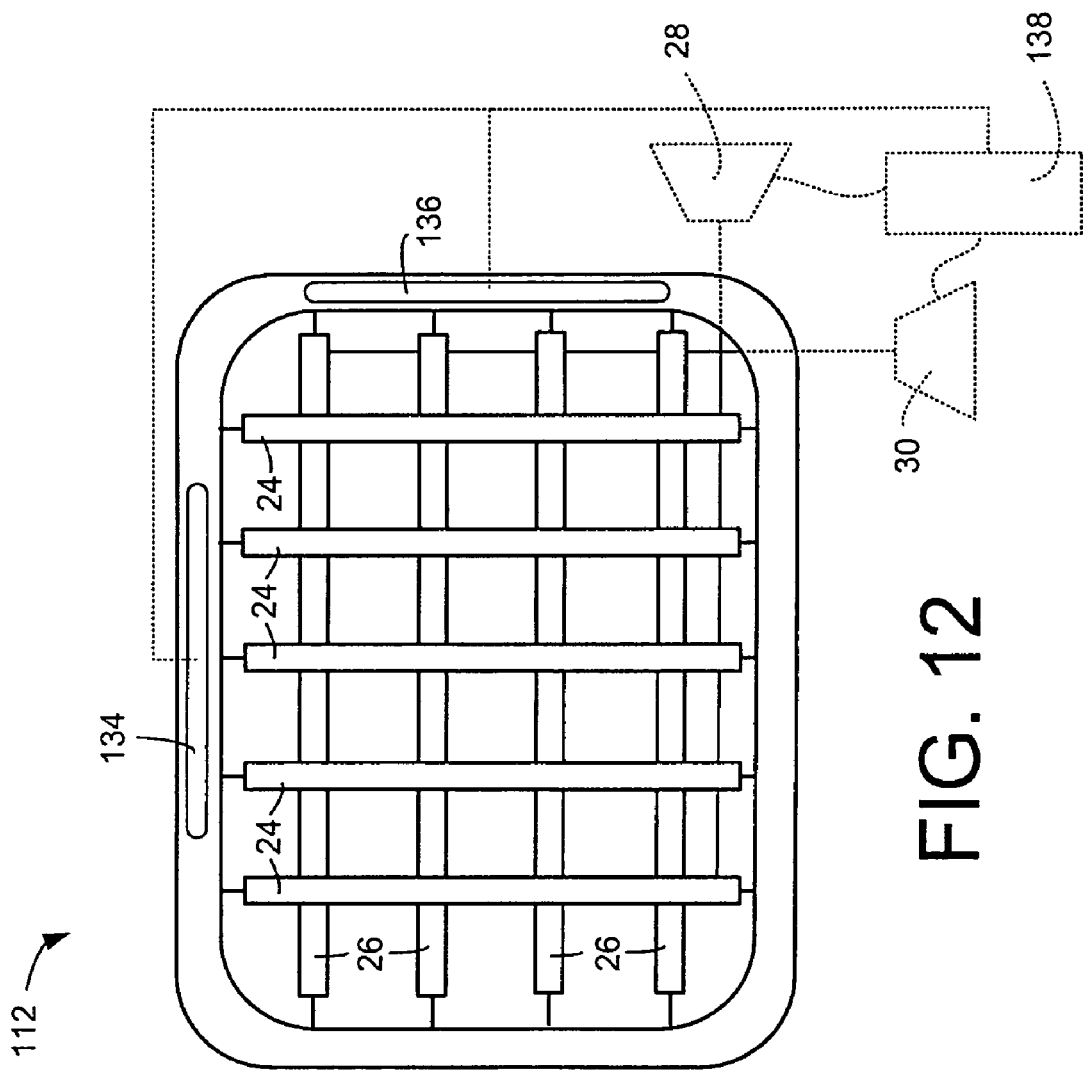
FIG. 12 is a schematic elevational view of a contact-free air vent showing vertically oriented air blades and horizontally oriented air blades positioned to allow air to flow straight out of the contact-free air vent in accordance with a second embodiment of the present invention.
Figure 14:
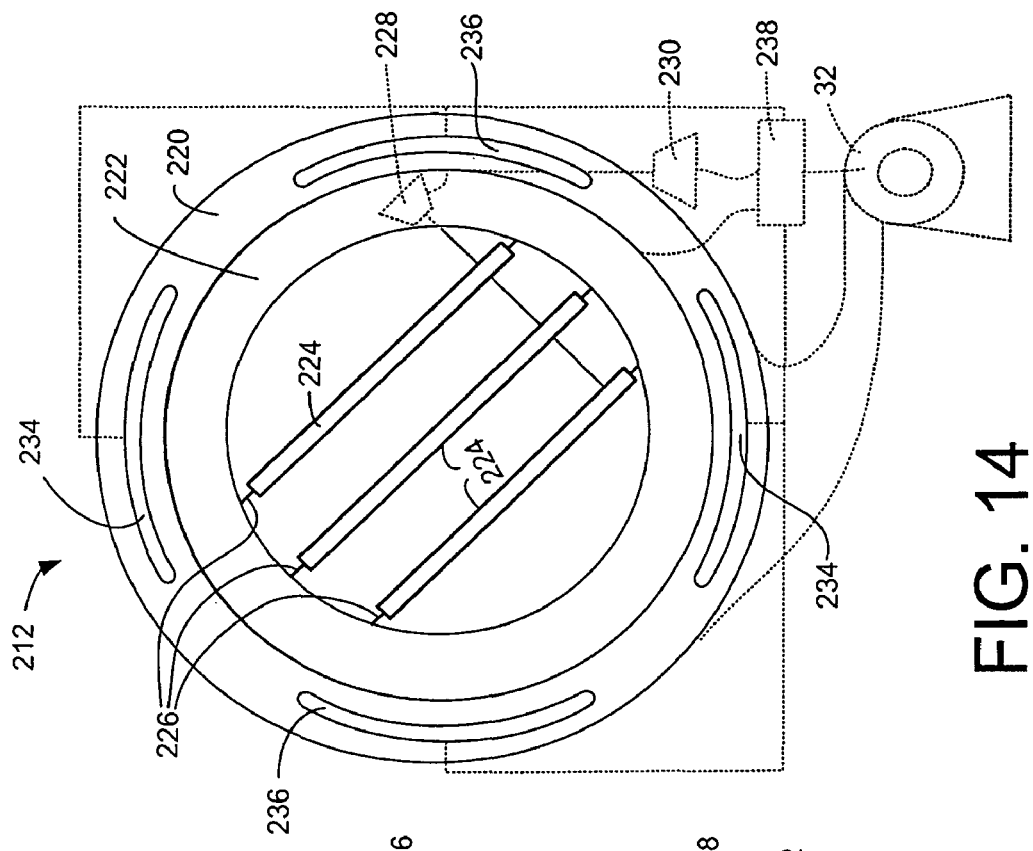
FIG. 14 is another schematic elevational view of the contact-free air vent showing the rotatable housing rotated from the position depicted in FIG. 13 in accordance with the third embodiment of the present invention.
Figure 13:
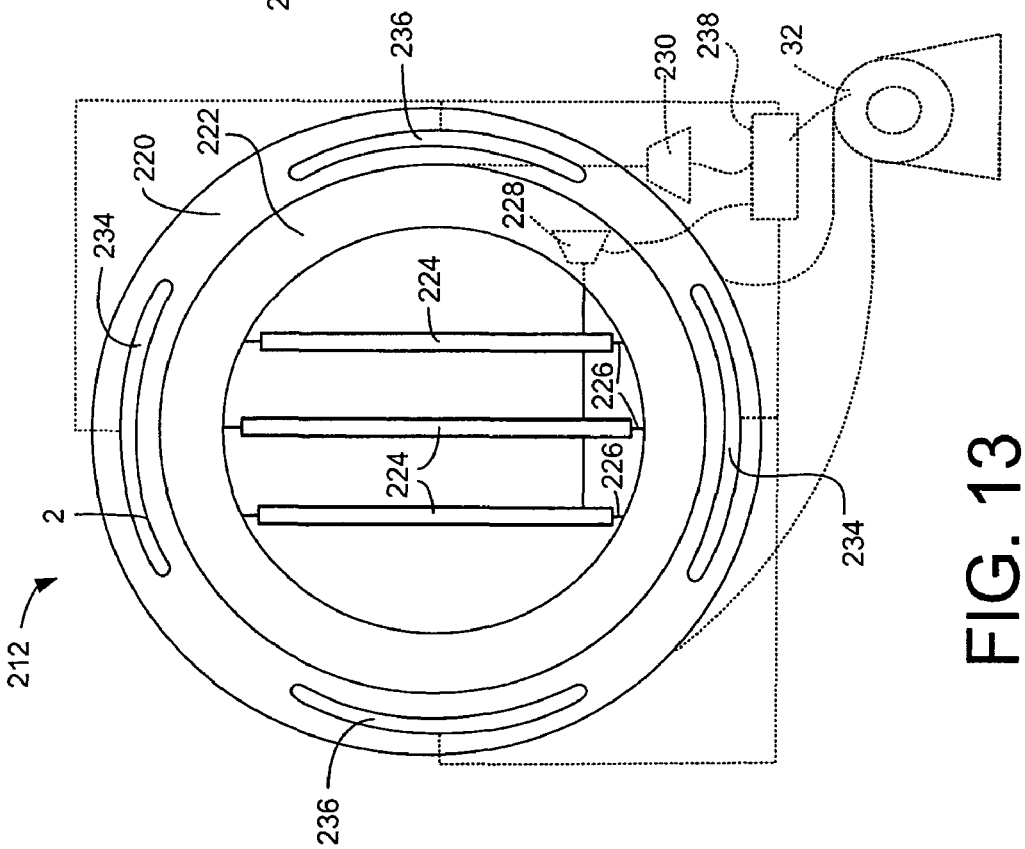
FIG. 13 is a schematic elevational view of another contact-free air vent showing a rotatable housing and air blades positioned to allow air to flow straight out of the contact-free air vent in accordance with a third embodiment of the present invention.

Referring now to FIG. 12, a contact-free air vent 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the contact-free air vent 112 has many of the same features as in the first embodiment, such as the outer housing 22, the plurality of vertically oriented air blades 24, the plurality of horizontally oriented air blades 26, the first servo device 28 and the second servo device 30. However, in the second embodiment the first pair of sensors 34 has been replaced with a sensor array 134, the second pair of sensors 36 has been replaced with a sensor array 136 and the controller 38 has been replaced with a controller 138.

In the second embodiment, the sensor arrays 134 and 136 are installed to the outer housing 22 and the controller 138 is operably connected to the first and second servo devices 28 and 30.

In the second embodiment, the sensor arrays 134 and 136 are similar or operate in a manner as sensors disclosed and described in U.S. Pat. No. 7,115,856 to Peng et al. More specifically, the sensor arrays 134 and 136 detect linear movement relative to their overall length. For example, the sensor array 134 is configured to detect horizontal movement relative to its length and the sensor array 136 is configured to detect vertical movement relative to its length.

The controller 138 is configured to monitor the movements detected by the sensor arrays 134 and 136. The controller 138 operates with the same basic steps as shown in the flowchart depicted in FIG. 11, except that in step S4, the controller 138 only determines whether or not there has been horizontal movement relative to the sensor array 134 and whether or not there has been vertical movement relative to the sensor array 138.

Thus, in step S5, if the controller 138 determines that there has been rightward movement in step S4, then the controller 38 transmits a corresponding signal to the first servo device 28 causing first servo device 28 to re-position the plurality of vertically oriented air blades 24 to angle rightward, as indicated in FIG. 5, such that air flow from the contact-free air vent 12 exhausts in a more rightward direction.

In step S5, if the controller 138 determines that there has been leftward movement, the controller 138 transmits a corresponding signal to the first servo device 28 causing first servo device 28 to re-position the plurality of vertically oriented air blades 24 to angle leftward, as indicated in FIG. 6, such that air flow from the contact-free air vent 12 exhausts in a more leftward direction.

In step S5, if the controller 138 determines that there has been upward movement, the controller 138 transmits a corresponding signal to the second servo device 30 causing second servo device 30 to re-position the plurality of horizontally oriented air blades 26 to angle upward, as indicated in FIG. 7, such that air flow from the contact-free air vent 12 exhausts in a more upward direction.

In step S5, if the controller 138 determines that there has been downward movement, the controller 138 transmits a corresponding signal to the second servo device 30 causing second servo device 30 to re-position the plurality of horizontally oriented air blades 26 to angle downward, as indicated in FIG. 8, such that air flow from the contact-free air vent 12 exhausts in a more downward direction.

Third Embodiment

Referring now to FIG. 13-17, a contact-free air vent 212 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the contact-free air vent 212 includes a fixed housing 220 and a rotatable housing 222 that supports a plurality of the flow control blades 224, a positioning mechanism that includes a first servo device 228 and a second servo device 230, a first pair of sensors 234, a second pair of sensors 236 and a controller 238 (a control unit).

The fixed housing 220 is attachable to the dashboard 14 in a manner similar to the attachment of the outer housing 22 of the first embodiment described above. The rotatable housing 222 is rotatably supported within the fixed housing 220. The rotatable housing 222 is configured to undergo at least ninety degrees of pivoting movement or rotational displacement relative to the fixed housing 220. For example, the rotatable housing 222 can be rotated at least forty-five degrees counter-clockwise from the orientation depicted in FIG. 13 to the orientation depicted in FIG. 14. Similarly, the rotatable housing 222 can be rotated at least forty-five degrees in a clockwise direction (not shown) thus providing at least ninety degrees of angular displacement. The flow control blades 224 are pivotable about shafts 226 that extend into blind bores (not shown) in the rotatable housing 222. In other words, the flow control blades 224 rotate with the rotatable housing 222.

The first servo device 228 is configured to position the flow control blades 224 relative to the rotatable housing 222 and the second servo device 230 is configured to angularly position or rotate the rotatable housing 222. The first servo device 228 and the second servo device 230 are preferably separate stepper motors, but can alternatively be any of a variety of electronic devices such as electric motors or solenoids, pneumatic devices or other similar devices that provide positioning control. The controller 238 is configured to re-position the orientation of the contact-free air vent 212 in response to detected linear and circular motions. More specifically, the controller 238 is configured to re-position the orientation of the flow control blades 224 in response to detected linear movements and rotate the contact-free air vent 212 in response to circular movements.

The first pair of sensors 234 and the second pair of sensors 236 are preferably the same and function in a manner consistent with the description of the first pair of sensors 34 and the second pair of sensors 36 of the first embodiment depicted in FIGS. 3-11. However, in the third embodiment, the first pair of sensors 34 and the second pair of sensors 36 are arcuately shaped.

The controller 238 operates in a manner consistent with the operation of the controller 38 of the first embodiment, as described with respect to FIG. 11, except that the controller 238 is further configured to determine whether or not the human hand H has undergone rotational movement in a first direction and rotational movement in a second direction, as indicated in FIG. 17.

Specifically at step S4 in FIG. 11, in response to recognizing rotational movement of the human hand H in a first direction (counter-clockwise), at step S5 in FIG. 11, the controller 238 causes the second servo device 230 to rotate the rotatable housing 222 in the counter-clockwise direction. For example, the controller 238 can move the rotatable housing 222 from the orientation depicted in FIG. 13 to the orientation depicted in FIG. 14.

At step S4 in FIG. 11, in response to recognizing rotational movement of the human hand H in a second direction (clockwise), at step S5 in FIG. 11, the controller 238 causes the second servo device 230 to rotate the rotatable housing 222 in the clockwise direction. For example, the controller 238 can move the rotatable housing 222 from the orientation depicted in FIG. 14 to the orientation depicted in FIG. 13.

At step S4 in FIG. 11, in response to recognizing rightward movement of the human hand H, at step S5 in FIG. 11, the controller 238 causes the first servo device 228 to pivot or rotate the flow control blades 224 rightward as depicted in FIG. 15.

At step S4 in FIG. 11, in response to recognizing leftward movement of the human hand H, at step S5 in FIG. 11, the controller 238 causes the first servo device 228 to pivot or rotate the flow control blades 224 leftward as depicted in FIG. 16.

As with the first embodiment, at step S4 in FIG. 11, in response to recognizing outward movement of the human hand H, at step S5 in FIG. 11, the controller 238 causes the speed of the blower motor 32 to increase.

As with the first embodiment, at step S4 in FIG. 11, in response to recognizing inward movement of the human hand H, at step S5 in FIG. 11, the controller 238 causes the speed of the blower motor 32 to increase.

Operation of the controller 238 is the same as the first embodiment with respect to the steps S1, S2 and S3 of FIG. 11.

The controllers 38, 138 and 238 preferably each include a microcomputer with movement determining and positioning control programs that evaluate signals from the sensors 34 and 36, 134 and 136, and 234 and 236, and controls the direction of air flow from the contact-free air vents 12, 112 and 212, as described above. The controllers 38, 138 and 238 can also include other conventional components such as an input interface circuit, an output interface circuit, and storage devices such as a ROM (Read Only Memory) device and a RAM (Random Access Memory) device.

It will be apparent to those skilled in the art from this disclosure that the precise structure and algorithms for the controllers 38, 138 and 238 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The various components of the vehicle 10 and vehicle air conditioning systems are conventional components that are well known in the art. Since vehicles 10 and vehicle air conditioning systems are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "rightward", "leftward" "forward", "rearward", "upward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A contact-free air vent flow direction control device comprising:
    an air vent having at least one flow control blade that moves between a plurality of predetermined orientations each corresponding to a direction of air flow from the air vent;
    a positioning mechanism operably coupled to the flow control blade;
    a touch-less motion sensor that detects relative movement of objects proximate the touch-less motion sensor;
    a blower motor that selectively provides air flow to the air vent at a plurality of blowing speeds; and
    a control unit operably connected to the touch-less motion sensor and the positioning mechanism programmed to control operation of the positioning mechanism in order to position the flow control blade in a selected one of the predetermined orientations in response to a corresponding one of a plurality of predetermined movements substantially parallel to the motion sensor detected by the touch-less motion sensor, and the control unit being operably connected to the blower motor and programmed such that the control unit increases the blower speed of the blower motor in response to detected movement away from the touch-less motion sensor and the control unit decreases the air flow output level of the blower motor in response to detected movement toward the touch-less motion sensor.

2. The contact-free air vent flow direction control device according to claim 1, wherein
    the control unit is configured to determine the presence of a portion of an occupant's body in response to the portion of the occupant's body being positioned within a predetermined distance from the touch-less motion sensor for a predetermined time period, and ignore the presence of the portion of the occupant's body in response to the portion of the occupant's body being positioned within the predetermined distance from the touch-less motion sensor for less than the predetermined time period.

3. The contact-free air vent flow direction control device according to claim 2, wherein
    the control unit is configured to change position of the flow control blade in response to determining the presence of the portion of the occupant's body and determining that the portion of the occupant's body has moved in a predetermined direction relative to the touch-less motion sensor.

4. The contact-free air vent flow direction control device according to claim 1, wherein
    one of the plurality of predetermined movements includes upward movement causing the control unit to re-position the flow control blade such that air flow from the air vent exhausts in a more upward direction, and
    another one of the plurality of predetermined movements includes downward movement causing the control unit to re-position the flow control blade such that air flow from the air vent exhausts in a more downward direction.

5. The contact-free air vent flow direction control device according to claim 1, wherein
    one of the plurality of predetermined movements includes leftward movement causing the control unit to re-position the flow control blade such that air flow from the air vent exhausts in a more leftward direction, and
    another one of the plurality of predetermined movements includes rightward movement causing the control unit to re-position the flow control blade such that air flow from the air vent exhausts in a more rightward direction.

6. The contact-free air vent flow direction control device according to claim 1, wherein
    the air vent includes a plurality of first flow control blades and a plurality of second flow control blades, the first flow control blades being configured to move in unison between a first set of the predetermined orientations to direct flow of air from the air vent relative a first air vent direction, the second flow control blades being configured to move in unison between a second set of the predetermined orientations to direct flow of the air from the air vent relative to a second air vent direction angularly offset from the first air vent direction.

7. The contact-free air vent flow direction control device according to claim 6, wherein
    the positioning mechanism includes a first servo device configured to position the first flow control blades and a second servo device configured to position the second flow control blades.

8. The contact-free air vent flow direction control device according to claim 7, wherein
    the first servo device and the second servo device are separate stepper motors.

9. The contact-free air vent flow direction control device according to claim 6, wherein
    the plurality of first flow control blades are oriented to pivot about vertical pivot axis and the plurality of second flow control blades are oriented to pivot about horizontal pivot axis.

10. The contact-free air vent flow direction control device according to claim 9, wherein
the control unit is configured to re-position the orientation of the plurality of first flow control blades in response to detected horizontal movements and configured to re-position the orientation of the plurality of second flow control blades in response to detected vertical movements.

11. The contact-free air vent flow direction control device according to claim 1, wherein
the air vent includes a rotatable housing supporting a plurality of the flow control blades and the positioning mechanism includes a first servo device configured to position the flow control blades relative to the rotatable housing and a second servo device configured to angularly position the rotatable housing.

12. The contact-free air vent flow direction control device according to claim 11, wherein
the first servo device and the second servo device are separate stepper motors.

13. The contact-free air vent flow direction control device according to claim 11, wherein
the control unit is configured to re-position the orientation of the air vent in response to detected circular motions and configured to re-position the orientation of the flow control blades in response to detected linear movements.

* * * * *